Jan. 15, 1957      O. H. BANKER      2,777,329
MOTION-TRANSMITTING DEVICE
Filed April 22, 1952      2 Sheets-Sheet 1
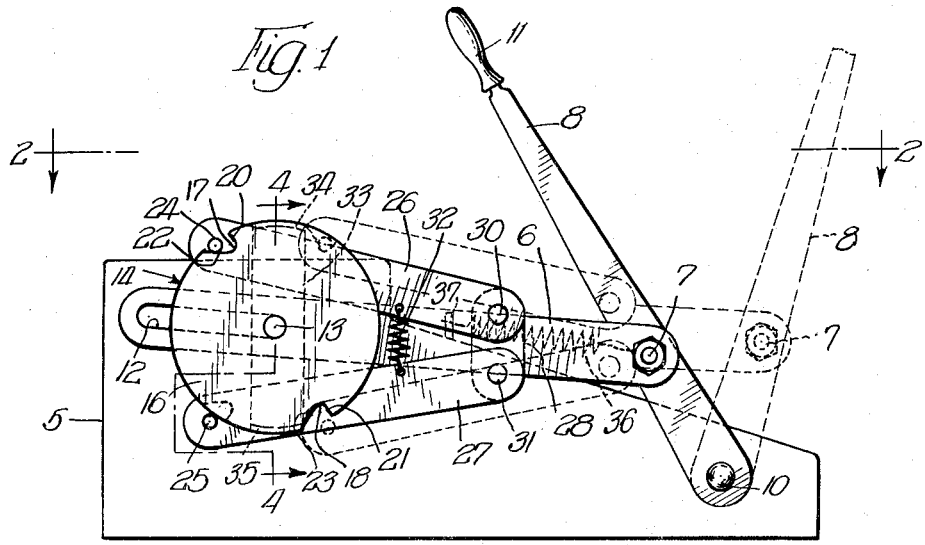
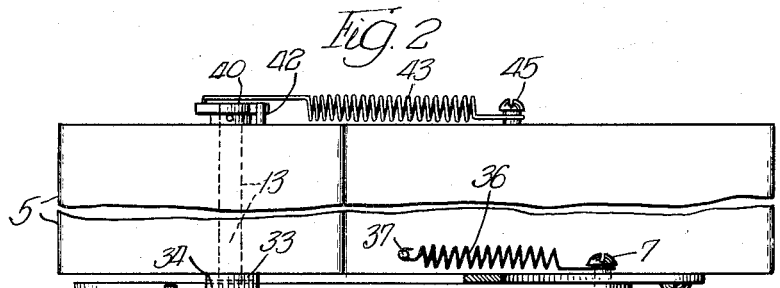
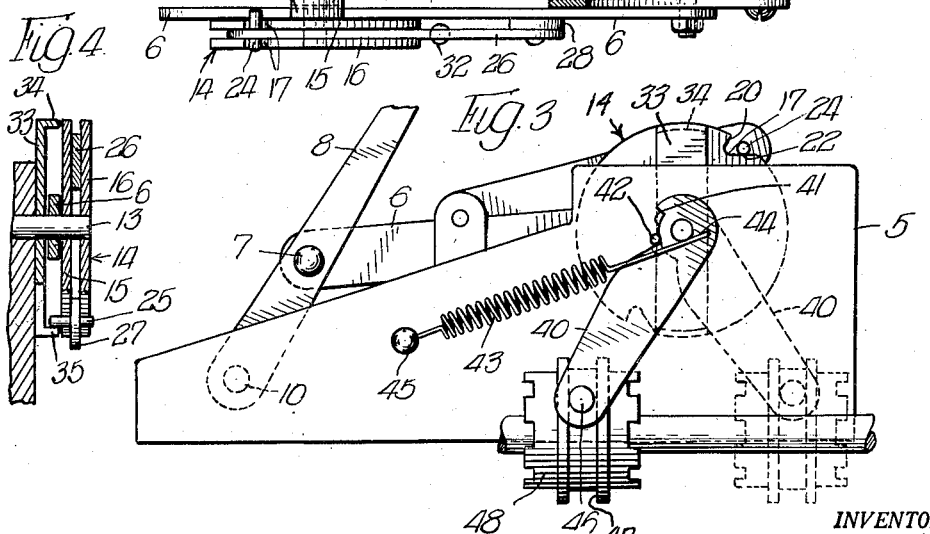
INVENTOR.
Oscar H. Banker,
BY
Cromwell, Greist & Warden
Attys.

Jan. 15, 1957 — O. H. BANKER — 2,777,329
MOTION-TRANSMITTING DEVICE
Filed April 22, 1952 — 2 Sheets-Sheet 2
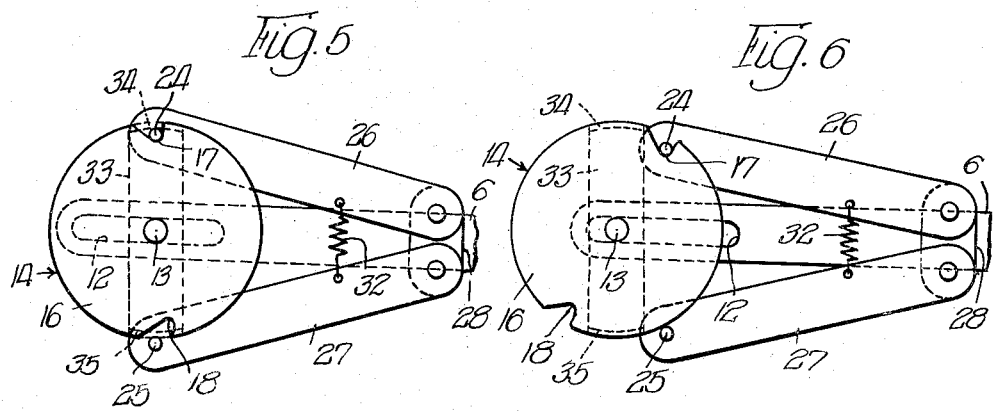
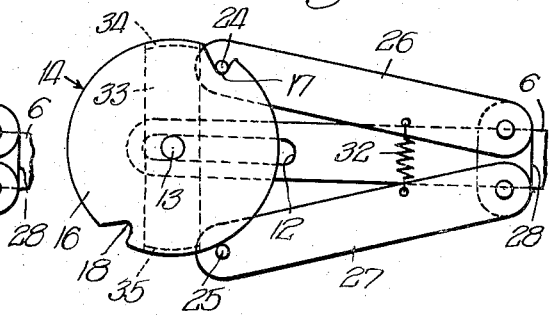
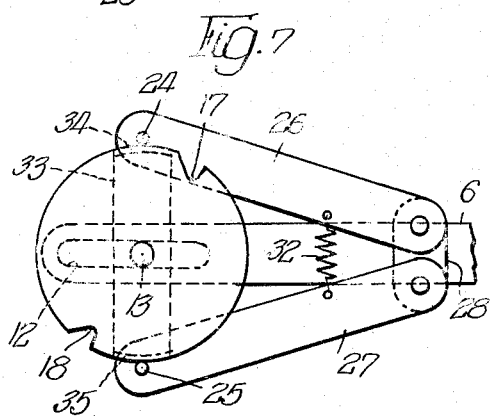
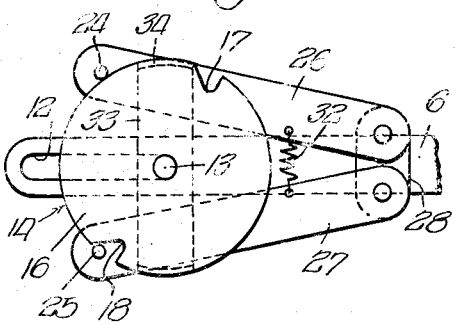
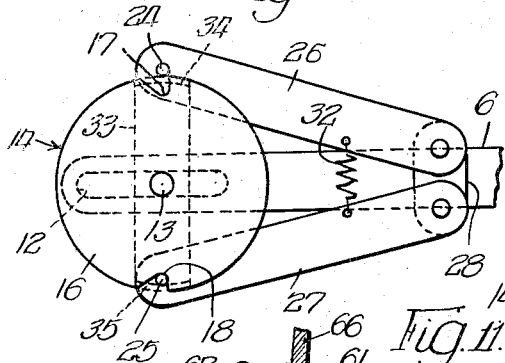
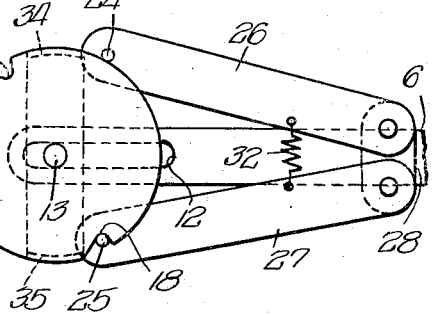
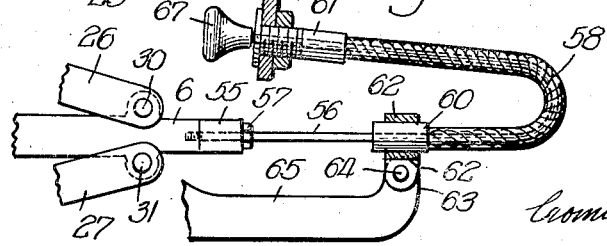
INVENTOR.
Oscar H. Banker,
BY
Cromwell, Greist & Warden
ATTYS.

United States Patent Office 2,777,329
Patented Jan. 15, 1957

2,777,329

MOTION-TRANSMITTING DEVICE

Oscar H. Banker, Evanston, Ill., assignor to New Products Corporation, Chicago, Ill., a corporation of Delaware Application April 22, 1952, Serial No. 283,739

9 Claims. (Cl. 74—96)

This invention relates, generally, to innovations and improvements in motion-transmitting devices, and it has particular relation to such devices wherein the reciprocation of a power-transmitting or actuating member turns an oscillatable driven member in one direction, and the next reciprocation of the actuating member turns the oscillatable driven member back to its original position.

There are certain power-applying means which are capable of exerting or transmitting a large force in one direction, but which at the most can exert only a small fraction of that force in the opposite direction. A strong rope, a chain, or a very flexible wire are examples of one type of such means. Thus, a rope, wire, chain or cable can transmit very high forces in tension but can exert or transmit little or no force in the opposite direction. A Bowden wire control is a common example. Another type of such means would be a simple and inexpensive vacuum-operated piston unit which can efficiently develop a large thrust in one direction only. A single-acting solenoid unit is another example of such a means which can deliver a large force or thrust in one direction only. The motion-transmitting device of the present invention has particular utility with such one-way thrust-delivering or force-transmitting means since it allows such means to be used for reciprocating or shifting an object or mechanism in opposite directions even when a substantial force is required. One specific field of application of the invention is the various remote control apparatus used in connection with atomic energy projects and nuclear reaction processes. The motion-transmitting device provided by this invention makes it possible in many instances to greatly simplify and cheapen the design of various remote control gear now in use in this particular field.

One object of the invention is the provision of a new and improved power-transmitting device which may be employed in many different machines and mechanisms requiring a motion-transmitting device of a type wherein the reciprocation of an actuating element from the position which it normally occupies to a retracted position and then back again to the normal position results in rotation of an oscillatable driven member from one of two positions which it normally occupies to the alternate position, and repetition of the reciprocating movement serves to return the driven member to its original position.

Another object of the invention is a new and improved motion-transmitting device or linkage wherein a reciprocably mounted actuating member is provided with a pair of pawls biased for alternate one-way clutched engagement with detents which are diametrically spaced on a rotatable member and including camming-out means, whereby when the reciprocable actuating member is retracted from a normal position, one of the pawls carried by it engages with the adjacent detent provided on the rotatable member thereby imparting rotation to the rotatable member to a second position, and the engaged pawl and detent combination is disengaged upon the return movement of the actuating member to its normal position while the rotatable member remains stationary, whereupon the second pawl carried thereby engages the second detent provided on the rotatable member and the next reciprocation of the actuating member between its normal position to its retracted position returns the rotatable member to its initial position, the camming-out means serving to prevent simultaneous engagement of both pawls in the detents.

Still another important object of the invention is the combination of my new and improved motion-transmitting device or linkage with a one-way force-transmitting or thrust-delivering means, such as a cable, rope, chain or Bowden wire on the one hand, or a vacuum operated piston unit or single-acting solenoid on the other hand, for shifting or reciprocating an element wherein a substantial force is required, the one-way force-transmitting or thrust-delivering means being capable of exerting such a substantial force in one direction only.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a side elevational view of a motion-transmitting device forming one embodiment of the invention with the operating parts being shown in full line in the position which they normally occupy at rest, and with these parts being shown in broken line in the position which they occupy in the retracted position;

Fig. 2 is a top plan view of the device shown in Fig. 1 taken on line 2—2 thereof;

Fig. 3 is a side elevational view taken from the reverse side of Fig. 1, one element being broken off, and with a shiftable machine part being shown in full and broken line in the two alternate positions into which it may be shifted by the motion-transmitting device;

Fig. 4 is a fragmentary detail sectional view taken on the line 4—4 of Fig. 1;

Figs. 5–10 are fragmentary side elevational views showing in cooperation with Fig. 1 the successive relationships of various parts when the motion-transmitting mechanism is operated through a complete cycle of movement; and Fig. 11 is a fragmentary view showing the manner in which a Bowden wire type remote control is combined with a motion-transmitting device of this invention.

Referring to Figs. 1–4 of the drawings, the reference numeral 5 indicates a suitable support for the power-transmitting or shifting device. The support 5 may take the form of a suitably shaped block as shown, which may be formed of any suitable material such as metal, wood or plastic, or the block 5 may be replaced by a frame or hollow casting. The device includes a reciprocable power-transmitting or actuating element 6 which may take the form of an elongated link pivotally connected at one end by means of a stud bolt 7 to an operating lever 8. The lever 8 is pivotally connected at its bottom end by a bolt 10 to one side of the block 5 and is provided on its upper end with a handle 11. At the opposite end the link or element 6 is provided with an elongated slot 12 which fits over a shaft 13 which passes through the block 5 and is journaled therein. A disk or wheel 14 composed of an inner disk section 15 and an outer disk section 16 is secured to the end of the shaft 13 which projects from the block 5 on the same side that the reciprocable actuating member 6 is carried. The actuating member 6 is located behind the back side of the inner disk section 15 as shown in Fig. 2. Each of the disk sections 15 and 16 of the wheel 14 is provided with a pair of detents 17 and 18 which are positioned or located diametrically opposite to each other. Each of the detents 17 and 18 has a steep, practically radial, side portion 20 and 21, respectively, located on the side toward the lever 8 and a flat entrance side 22 and 23, respectively. It will be seen that detents 17—17 and detents 18—18 in the members 15 and 16 are aligned or register one with the other.

The detents 17—17 and 18—18 are adapted to have one-way clutched engagement at alternate times with pawls 24 and 25, respectively, which are carried on the free ends of upper and lower link or arm members 26 and 27, respectively. The pawls 24 and 25 are in the form of pins which project on opposite sides of the links 26 and 27. The links 26 and 27 extend between the disk sections 15 and 16 and are pivotally mounted at their ends opposite the pawls or pins 24 and 25, respectively, to a bracket 28 secured to the actuating member 6 intermediate the ends thereof. The link 26 is pivotally connected to the top of the bracket 28 by means of a rivet 30 and the link 27 is pivotally connected to the bottom of the bracket 28 by means of a rivet 31. In order to bias the links 26 and 27 toward each other and to cause the pawls or pins 24 and 25 to engage and bear against the periphery of the wheel 14 and into one-way clutched engagement in the detents 17—17 and 18—18, a tension spring 32 is provided, the opposite ends of which are hooked into holes provided therefor in the pawl-supporting arms 26 and 27, as shown.

In order to prevent the pawls 24 and 25 from simultaneously engaging in the respective detents 17—17 and 18—18 during the operation of the device, a camming-out member 33 is provided which may take the form of a flat strip having a length corresponding to the diameter of the wheel 14 and having an opening in the middle so as to fit over the shaft 13, as shown. At the opposite ends the member 33 is provided with outwardly projecting arcuate cam flanges 34 and 35 at the top and bottom, respectively, each of which has a radius of curvature corresponding to that of the periphery of the wheel 14. The outer surfaces of the cam flanges 34 and 35 are approximately flush and even with the periphery or rim of the wheel 14. The arcuate length of the cam projections 34 and 35 must exceed the arcuate length of the entrance openings leading into each of the detents 17—17 and 18—18. Actually, the cams 34 and 35 have an arcuate length somewhat in excess of this minimum dimension and this does not interfere with the operation of the device as long as the cams do not prevent the pawls 24 and 25 from alternately dropping into the detents 17—17 and 18—18, respectively, as will be explained in more detail hereinafter.

The operating lever 8 together with the reciprocable actuating member 6 and the links 26 and 27 are normally held or retained in their forward position as indicated in full line in Fig. 1 by means of a tension spring 36 (Fig. 2) one end of which is fastened to a pin 37 projecting from the block 5 and the other end of which is hooked over the stud bolt 7.

The shaft 13 projects on the opposite side of the block 5 from the wheel 14 and carries on that projecting end a crank arm 40 which is secured or fastened thereto so as to turn with the shaft 13. A gap 41 is provided in the circular end of the crank 40 for cooperation with a stop pin 42 which projects from the side of the block 5 into the arcuate gap 41. It will be seen that this pin 42 serves to limit or stop the swinging movement of the crank arm 40 when the opposite ends of the gap 41 come into engagement therewith. In order to hold the shaft 13 and the elements mounted thereon including the wheel 14 and the crank 40 in either of the two opposite positions defined by the pin 42 engaging opposite ends of the gap 41, an overcenter spring action is obtained by connecting one end of a tension spring 43 to the crank arm 40 through a hole provided therein as indicated at 44 in Fig. 3 while connecting the opposite end of the spring 43 to a pin 45 projecting on the side of the block 5. It will be seen that the spring 43 is connected to the crank arm 40 on the opposite side of the shaft 13 from the pin 45 thereby giving the overcenter action.

The crank arm 40 may be used to shift any one of a number of different elements of a machine or other apparatus. By way of example and illustration, the crank arm 40 could be used in lieu of the crank or lever 67 in the transmission disclosed in my Patent No. 2,384,448, granted September 11, 1945, to which reference is hereby made. According to the disclosure of that patent, a lever 67 serves to shift an element designated at 50 between different positions in the transmission disclosed therein. In Fig. 3 of the drawings the crank arm 40 is shown provided with a projection 46 on its outer end which extends into a circumferential groove 47 formed in a transmission element 48 which may correspond to the element 50 in the transmission disclosed in my Patent No. 2,384,448.

The motion-transmitting device described above in connection with Figs. 1–4 operates in the following manner: Assume that the operating elements of the device are at rest and that they occupy the positions shown in full line in Figs. 1 and 3 of the drawings. This is the forward or normal position for the operating lever 8 and the reciprocating power-transmitting member 6 and the parts carried thereby, and is one of the two normal positions for the wheel member 14, the shaft 13 and the crank arm 40 carried thereon. To operate the device the handle 11 is grasped and the lever 8 is pulled rearwardly (clockwise as viewed in Fig. 1) to the position shown in broken line in Fig. 1. During this movement the power-transmitting element 6 is retracted to the position shown in broken line in Fig. 1. As the actuating element 6 is retracted, the upper pawl pin 24 engages in the detents 17—17 and bears against the sides 20—20 thereof thereby causing the wheel 14 to turn clockwise as viewed in Fig. 1. During this movement the lower pawl pin 25 is slidably bearing on the rim or periphery of the wheel sections 15 and 16 since its associated detents 18—18 are located diametrically opposite the detents 17—17. In Fig. 5 of the drawings the relationship between the parts is shown when the element 6 has been retracted halfway from the position shown in Fig. 1 and the pawls 24 and 25 are in line with the vertical axis of the wheel 14. It will be seen from Fig. 5 that the opposite ends of the upper pawl pin 24 are seated in the bottoms of the detents 17 and lie underneath the upper cam projection 34. The opposite ends of the lower pawl pin 25 engage the lower cam member or flange 35 which prevents the pawl from dropping into the detents 18—18. Full retraction of the actuating element 6 and the operating lever 8 brings the parts into the position shown in Fig. 6. Referring to this figure it will be seen that the pawl 24 has now turned the detents 17—17 to their position of farthest rotation in a clockwise direction while the bottom detents 18—18 have been advanced fully to the farthest position which they occupy in a clockwise direction.

The lever 11 is now returned toward the left as viewed in Fig. 1 either manually or under the influence of the spring 37. When the lever 11 is halfway back on the return stroke and the reciprocable member 6 is likewise halfway returned, the parts will have the relationship shown in Fig. 7. It will be seen in this figure that both the upper pawl 24 and the lower pawl 25 are riding on the cams 34 and 35, respectively, and also on the peripheral edges of the wheel sections 15 and 16. The shallow sides 22—22 of the detents 17—17 permitted the pawl 24 to slide easily out of the detents and up onto the rim of the wheel 14 from the position shown in Fig. 6 while the wheel 14, the axle 13, and the crank arm 40 are held in the position shown in Fig. 6 by means of the spring 43. It will be understood that the point of connection of the spring 43 to the arm 40 passed over the center of the shaft 13 when the wheel 14 was turned to the position shown in Fig. 6.

In Fig. 8 the relationship between the parts is shown when the lever 8 and the member 6 have been completely returned to their starting positions. The lower pawl 25 is now in a position to enter into the detents 18—18 whereas the upper pawl 24 bears on the outer rim of the wheel 14. Now when the lever 8 and the reciprocating member 6 are once again retracted, the pin 25 engages in the detents 18—18 and causes the wheel 14 to rotate in a counterclockwise direction. When the parts have been retracted halfway they will occupy the relationship as shown in Fig. 9 wherein the upper pawl 24 is cammed out and rests on the upper cam 34 which prevents it from dropping into the detents 17—17 while the lower pawl 25 is seated in the detents 18—18 and is passing above the bottom cam 35. Upon complete retraction of the operating lever 8 and the reciprocating member 6 for the second time, the parts will occupy the position shown in Fig. 10 in which relationship the wheel 14 has again been returned to the position shown in Fig. 1 which was the original position it occupied. The wheel 14 will be retained in this position by the action of the spring 43 while the operating lever 8 and the reciprocating member 6 and the elements carried thereby are returned to the original position as shown in Fig. 1, thereby completing one complete cycle of operation of the motion-transmitting device.

It will be understood that the spring 43 acts as an overcenter spring and retains the wheel 14 either in the position shown in Figs. 1 and 10 or in the position shown in Fig. 8, unless the device is operated so as to positively change the position of the wheel 14, as described. In like manner, it will be seen that the crank arm 40 is similarly retained first in one alternate position and then in its other alternate position and shifts the element 48 between its alternate positions in a like manner.

From the foregoing description it will be seen that the wheel 14 and the crank arm 40 shift in only one direction when the operating lever 8 and the reciprocable actuating member 6 are retracted and then returned. That is to say, a complete reciprocation (i. e. retraction and return) of the actuating member 6 is required to shift the wheel 14 and crank 40 and bring the operating parts back in relationship so that on the following reciprocation the wheel 14 and the crank arm 40 can be shifted in the opposite direction.

As mentioned above, the motion-transmitting devices of this invention are adapted to be operated by one-way force-transmitting or thrust-delivering means. Referring to Fig. 11, for example, a Bowden wire control is shown connected to the motion-transmitting device described above in connection with Figs. 1–10. The operating lever 8 is removed and the adjacent end of the actuating element 6 is provided with a stationary nut 55 for receiving the threaded end of the wire 56. A lock nut 57 is provided for adjustably locking the end of the wire 56 against twisting once it has been connected and suitably adjusted. The wire 56 passes through a flexible conduit 58 provided on opposite ends with sleeve fittings 60 and 61. The fitting 60 is supported in a clamp 62 having an integrally formed ear 63 which is apertured so as to receive a rivet 64 by which it is secured onto an upturned end of a suitable support indicated at 65.

The fitting 61 is externally threaded on one end so as to screw into a suitable support 66, such as a control panel or the dashboard of a car or plane. A knob 67 is provided on the adjacent end of the wire 56, as shown. The manner in which the combination operates is obvious. When the knob 67 is pulled out, the element 6 is retracted. The wire 56 is capable of transmitting a substantial force, e. g. 100 lbs., when the knob 67 is pulled out but may only be capable of transmitting a force not exceeding 5 lbs. when the knob 67 is pushed in. The tension of the re-setting spring 36 (Fig. 2) assists in the pushing in of the knob 67 and may be strong enough so that it will automatically re-set the device when the knob 67 is released.

It will thus be apparent how a Bowden wire type control may be used in combination with the motion-transmitting device to remotely shift some element back and forth even though the wire can transmit in only one direction a force sufficient for the shifting.

In like manner, the plunger of a vacuum-operated unit or the armature of a single-acting solenoid may be connected to the actuating element 6 instead of the Bowden wire.

Since certain changes of an obvious nature may be made in the motion-transmitting device, and since it may be used in other obvious combinations, without departing from the spirit and scope of the invention, all matter described above or shown in the accompanying drawings is intended to be interpreted as illustrative and not in a limiting sense.

What is claimed as new is:

1. In combination, a rotatably mounted member which is adapted to be oscillated, a reciprocable power-transmitting element which is adapted to turn said oscillatable member in one direction when the element is reciprocated and is adapted to turn said oscillatable member in the opposite direction when the element is again reciprocated, two pawl-engaging detents on the oscillatable member at opposite sides of the center thereof, two pawls carried by the reciprocable element for one-way clutched engagement with said detents, and stationary means for preventing clutched engagement of each pawl with its detent when the other pawl is in clutched engagement with its detent.

2. A motion-transmitting device comprising, in combination, a wheel, means for supporting said wheel for oscillation about its principal axis, an actuating member for said device, support means for said actuating member whereby it is reciprocable in a plane generally parallel to the plane of said wheel, a pair of pawl and detent combinations each of which combinations has one engaging part thereof mounted on said wheel and the other engaging part mounted from said actuating member, the parts mounted on said wheel being mounted on opposite sides thereof, means for biasing said parts of each of said pawl and detent combinations into engagement when the parts are in registration, and stationary cam means for each of said pawl and detent combinations for maintaining the engaging parts of one combination out of engagement when the engaging parts of the other combination are in interlocking engagement and the parts of both combinations are in register.

3. In combination, a rotatably mounted member which is adapted to be oscillated, a reciprocable actuating member which is adapted to turn said oscillatable member in one direction when said actuating member is reciprocated and to turn said oscillatable member in the opposite direction the next time said actuating member is reciprocated, two pawl-receiving detents on said oscillatable member located on opposite sides thereof, two pawls mounted from said actuating member for alternate one-way engagement with said detents, means for biasing each of said pawls into one-way clutched engagement with the adjacent detent when in registration therewith, and a stationary cam for each of said pawls for maintaining the associated pawl out of engagement with its associated detent when the same are in registration with each other and the other pawl is in engagement with its associated detent.

4. A motion-transmitting mechanism, comprising, a wheel, means for supporting said wheel for oscillation about its principal axis, an actuating member for said device, means for supporting said actuating member for reciprocation toward and away from said principal axis in a plane generally parallel to the plane of said wheel, said wheel having two diametrically opposed detents formed in the periphery thereof, two pawls, means for supporting said pawls on opposite sides of said actuating member so that each pawl is engageable in one of said detents, spring means operatively connected with said pawls and biasing the same against the periphery of said wheel and into one of said detents when in registration therewith, a pair of pawl supporting cams each of which is stationarily positioned on opposite sides of the center of said wheel and is so disposed that it supports the adjacent pawl from engaging in its associated detent if not already engaged when the pawl becomes supported by the cam, and each of said cams permitting the associated pawl to pass by unsupported if the pawl is already engaged in its associated detent.

5. A motion-transmitting device comprising, in combination, a wheel, means for supporting said wheel for oscillation about its principal axis, an actuating member for said device, support means for said actuating member whereby it is reciprocable in a plane generally parallel to the plane of said wheel, a pair of pawl and detent combinations each of which combinations has one engaging part thereof mounted on said wheel and the other mounted on said actuating member, the parts mounted on said wheel being mounted on opposite sides thereof, means for biasing said parts of each of said pawl and detent combinations into engagement when the parts are in registration, stationary cam means for each of said pawl and detent combinations for maintaining the parts of one combination out of engagement when the parts of the other combination are in interlocking engagement and the parts of both combinations are in register, and biasing means operatively connected with said wheel for retaining it in the position into which it is turned on engagement of one of said pawl and detent combinations and retraction of said operating member until it is turned to an alternate position on engagement of the other of said pawl and detent combinations and retraction of said operating member.

6. A motion-transmitting mechanism, comprising, a wheel composed of a pair of spaced disks, axle means for supporting said wheel for oscillation about its principal axis, an elongated actuating member for said device one end of which is slidably supported on said axle so that it may be reciprocated in and out from said axle, said disks each having two diametrically opposed one-way detents formed in the peripheries thereof with each detent in one disk being aligned with a detent in the other disk so as to provide said wheel with two sets of diametrically opposed detents, a pair of pawl supporting arms pivotally supported on said operating member on opposite sides thereof so as to fit in between said disks and be swingable toward said axle, a pawl pin supported on the free end of each of said arms and projecting on opposite sides thereof so as to ride on the rims of said disks and to engage in said detents, spring means connected to said arms so as to bias each arm toward said axle and to press each of said pawls against the rims of said disks and into said detents when in registration therewith, and a pair of arcuate cam flanges mounted on opposite sides of said axle and to one side of said wheel, each of said cam flanges having an outer arcuate cam surface substantially even with the rim of the adjacent disk and having a length greater than the openings into said detents, said pawls projecting sufficiently on the side of said cam flanges so as to ride thereon and said pawl projections riding underneath said cam flanges when in clutched engagement in one of said detents.

7. In combination: a motion-transmitting device comprising a wheel, means for supporting said wheel for oscillation about its principal axis, an actuating member for said device, support means for said actuating member whereby it is reciprocable in a plane generally parallel to the plane of said wheel, a pair of pawl and detent combinations each of which combinations has one engaging part thereof mounted on said wheel and the other engaging part mounted from said actuating member, the parts mounted on said wheel being mounted on opposite sides thereof, means for biasing said parts of each of said pawl and detent combinations into engagement when the parts are in registration, and stationary cam means for each of said pawl and detent combinations for maintaining the engaging parts of one combination out of engagement when the engaging parts of the other combination are in interlocking engagement and the parts of both combinations are in register; and, a one-way force transmitting means operatively connected to said actuating member for transmitting force thereto in one direction.

8. In combination: a motion-transmitting device comprising a wheel, means for supporting said wheel for oscillation about its principal axis, an actuating member for said device, support means for said actuating member whereby it is reciprocable in a plane generally parallel to the plane of said wheel, a pair of pawl and detent combinations each of which combinations has one engaging part thereof mounted on said wheel and the other engaging part mounted from said actuating member, the parts mounted on said wheel being mounted on opposite sides thereof, means for biasing said parts of each of said pawl and detent combinations into engagement when the parts are in registration, and stationary cam means for each of said pawl and detent combinations for maintaining the engaging parts of one combination out of engagement when the engaging parts of the other combination are in interlocking engagement and the parts of both combinations are in register; and a Bowden wire control the pull wire of which is connected to said actuating element for shifting the same in one direction.

9. In combination: a motion-transmitting device comprising a wheel, means for supporting said wheel for oscillation about its principal axis, an actuating member for said device, support means for said actuating member whereby it is reciprocable in a plane generally parallel to the plane of said wheel, a pair of pawl and detent combinations each of which combinations has one engaging part thereof mounted on said wheel and the other engaging part mounted from said actuating member, the parts mounted on said wheel being mounted on opposite sides thereof, means for biasing said parts of each of said pawl and detent combinations into engagement when the parts are in registration, and stationary cam means for each of said pawl and detent combinations for maintaining the engaging parts of one combination out of engagement when the engaging parts of the other combination are in interlocking engagement and the parts of both combinations are in register; and, a one-way thrust-delivering means operatively connected to said actuating member for transmitting force thereto in one direction.

References Cited in the file of this patent

UNITED STATES PATENTS

| 1,322,333 | Noonan | Nov. 18, 1919 |
| 1,467,765 | McMullin | Sept. 11, 1923 |
| 1,929,268 | Bath | Oct. 3, 1933 |
| 2,173,036 | Clerk | Sept. 12, 1939 |
| 2,238,043 | Kleen | Apr. 15, 1941 |
| 2,554,312 | Price | May 22, 1951 |
| 2,578,142 | Mayrath | Dec. 11, 1951 |
| 2,580,108 | Long | Dec. 25, 1951 |

FOREIGN PATENTS

| 407,809 | Germany | Jan. 2, 1925 |